United States Patent [19]
Weiss

[11] 3,932,029
[45] Jan. 13, 1976

[54] OPTICAL REFLECTOR FOR LASERS
[75] Inventor: Manfred Weiss, Moorestown, N.J.
[73] Assignee: RCA Corporation, New York, N.Y.
[22] Filed: May 13, 1974
[21] Appl. No.: 469,327

[52] U.S. Cl. ............... 350/310; 350/288; 350/292; 350/299
[51] Int. Cl.² .......................................... G02B 5/08
[58] Field of Search ............ 126/270; 350/288, 292, 350/299, 310; 331/94.5 D

[56] References Cited
UNITED STATES PATENTS

| | | | |
|---|---|---|---|
| 291,147 | 1/1884 | Calver | 126/270 |
| 2,987,961 | 6/1961 | Cotton et al. | 350/292 |
| 3,781,094 | 12/1973 | Griest | 350/288 X |

Primary Examiner—Alfred E. Smith
Assistant Examiner—F. L. Evans
Attorney, Agent, or Firm—Edward J. Norton; William Squire

[57] ABSTRACT

Optical surface distorting thermal stresses are significantly reduced in an optical reflector by a structure consisting of a plurality of hollow reflector cells. Each cell has a light reflecting surface arranged to provide a composite continuous reflecting surface for an incident optical wavefront. Each reflector cell includes an internally located feeder tube which directs a flow of coolant from a manifold distribution system against internal cell walls.

4 Claims, 2 Drawing Figures

OPTICAL REFLECTOR FOR LASERS

BACKGROUND OF THE INVENTION

1. Field of the Invention

This invention relates to optical reflectors and more particularly to an optical reflector comprising multiple optical reflector cells, each being individually cooled.

2. Description of the Prior Art

A mirrored or polished front surface of an optical reflector is commonly used to reflect or direct an incident optical wavefront in a desired direction. The source of the optical wavefront may be a relatively high power laser. Reflector front surface properties, such as surface roughness, cause a portion of the incident optical wavefront to be abosrbed by the reflector. The absorbed optical energy is converted to thermal energy which is transferred through the reflector by conduction. The thermally induced temperature increase in the reflector establishes thermal compressive stresses which distort the shape or linearity of the reflector front surface causing errors in the direction of the reflected optical wavefront.

Prior art methods of cooling or dissipating the thermal energy induced on the reflector front surface include fins or radiators connected to the back surface of the reflector. The fins or radiators serve as a heat sink which permits radiation of the induced thermal energy but do not effectively prevent reflector front surface distortions.

Other prior art cooling methods include a flow of a fluid or coolant under relatively high pressure against the back surface of the reflector. However, such methods are not desirable in certain applications involving reflectors having a relatively large reflector front surface and requiring excessive coolant flow under relatively high pressure.

SUMMARY OF THE INVENTION

Thermal stresses causing surface distortion on an optical reflector surface are minimized in an optical reflector comprising multiple hollow reflector cell means having internal walls and light reflecting surfaces arranged to provide a composite continuous reflecting surface for an incident optical wavefront. Coolant feeder means inside each of the reflector cell means direct a flow of coolant to said internal cell walls. Reflector base means is connected to the reflector cell means and the coolant feeder means. The reflector base means has first and second chambers. The first chamber permits a flow of coolant to the coolant feeder means and the second chamber collects the coolant from the internal cell walls.

DESCRIPTION OF THE PREFERRED EMBODIMENT

Figure 1:
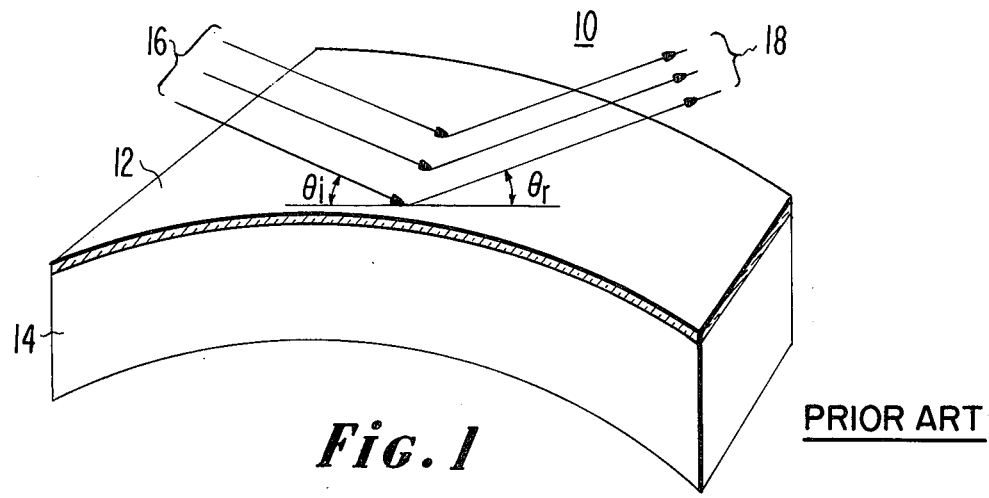
FIG. 1 is a cross section of a prior art metallic optical reflector.

Referring to FIG. 1, there is shown a cross section of a prior art metallic optical reflector 10 having a mirrored front surface 12 supported by a relatively stiff base 14. Parallel rays 16 from a suitable source of light having a relatively high level of radiant flux, such as a laser, are incident on mirrored front surface 12 of optical reflector 10. It is desired that optical reflector 10 reflect all of incident parallel rays 16 at an angle, $\theta_r$, equal to the incident angle, $\theta_i$. However, surface properties cause a portion of incident parallel rays 16 to be absorbed by mirrored front surface 12 and converted to heat. This heat produces thermal compressive stresses which distort mirrored surface 12 causing angle errors in reflected rays 18. Thus, the incident ray angle, $\theta_i$, is not equal to the reflected ray angle, $\theta_r$.

Figure 2:
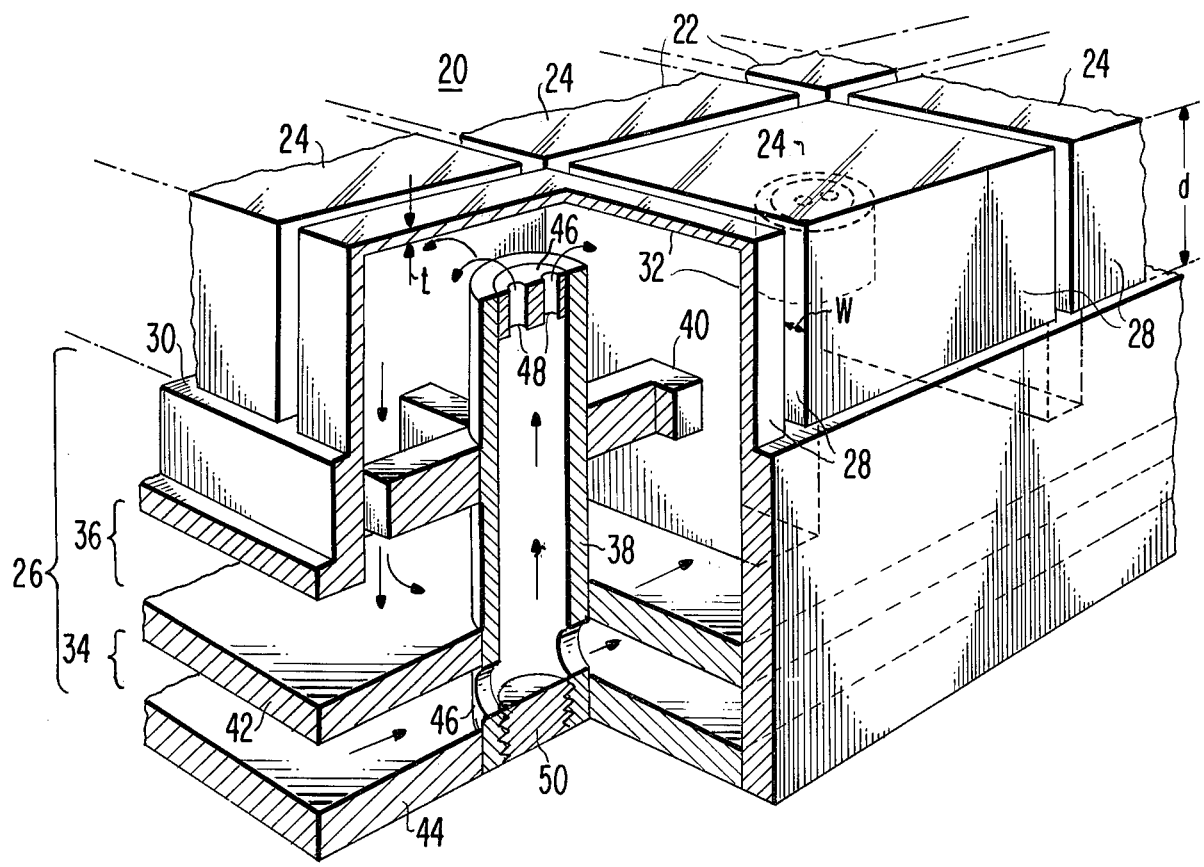
FIG. 2 is a perspective view, partly in cross section, of a preferred embodiment of an optical reflector according to the invention.

Referring to FIG. 2, there is shown a cross section of an optical reflector 20 according to the invention. Optical reflector 20 is formed of a plurality of reflector surfaces 24 arranged to form a continuous composite surface. A plurality of thin walled, hollow, metallic cells 22, each having a light reflecting front surface 24, are positioned on a relatively rigid or stiff common base 26. By way of example and not limitation, the geometric shape of each reflecting front surface 24 is rectangular or square. The cell reflectors 22 are arranged according to the invention to significantly reduce, if not minimize the distortion of optical reflector 20, due to localized thermal compressive stresses induced in metallic cells 22 by an external source of thermal energy. The multiple cell reflectors 22 collectively appear as a single reflector having a continuous reflecting surface for an incident optical ray. Each cell 22 has at least one outside wall 28 separated from an outside wall of an adjacent cell by a gap having a width W. Optical energy absorbed in the gap is minimized by choosing the gap width, W, to be as small as possible and yet permit thermal expansion of a cell without interferring with an adjacent cell. Each cell 22 also includes internal cooling means, described below, for dissipating thermal energy conducted along both internal 32 and external 24 and 28 cell surfaces.

The thermal energy induced on mirrored reflective surface 24 by laser beam is transferred to internal surface 32 by conduction. The thickness, $t$, of a cell wall between surfaces 24 and 32 is chosen to minimize the magnitude of any thermal gradient which may exist between surfaces 24 and 32 while still maintaining suitable mechanical stiffness. Some thermal energy will be conducted along cell wall 28. The height, $d$, of cell wall 28 supporting surface 24 is chosen to permit dissipation of the thermal energy by the cooling means before the heat is transferred to reflector base surface 30. The reflector base surface 30 is accordingly prevented from being distorted by thermal compressive stresses.

Reflector base 26 includes first and second chambers 34 and 36, respectively. The first chamber 34 or manifold is suitably arranged to permit a flow of fluid coolant, from a coolant source, not shown, to multiple coolant feeder tubes 38 supported by web-like member 40. For purpose of illustration and not limitation, feeder tube 38 is also supported by the intermediate wall 42 between first and second chambers 34 and 36, respectively, and bottom wall 44 of first chamber 34. Feeder tube 38 is provided with an aperture 46 suitable for permitting a flow of coolant from the first chamber 34 to the interior of feeder tube 38. The coolant feeder tube 38 is arranged with a metering nozzle 46 for providing a flow of coolant from feeder tube 38 to inner surface 32 of cell 22. Metering nozzle 46 includes at least one orifice 48 for providing an egress for the fluid coolant from feeder tube 38 to the internal cell cavity. For purpose of illustration and not limitation, metering nozzle 46 includes a pair of circular holes 48 each having a suitable diameter for directing a turbulent flow of liquid coolant in the form of a spray against internal cell surfaces 32 or by a slower laminar or turbulent coolant flow where the attitude of reflector 20 with respect to gravitional forces permits the option of completely filling cells 22 with a coolant. Removable plug 50 at one end of feeder tube 38 permits access to metering nozzle 46 for servicing or changing. The liquid coolant sprayed or flowed against internal cell surfaces 32 is collected in second reflector base cavity 36 arranged to return the coolant to a reservoir, not shown.

The feeder tubes 38 of multiple reflector cells 22 are arranged to provide parallel paths for a flow of coolant against internal cell surfaces 32. The magnitude of the coolant pressure required to minimize distortion of a cell reflector surface due to thermal compressive stress is relatively small since the total internal surface area of the cell walls is relatively small. Thus, unlike prior art optical reflectors, the parallel coolant paths to internal surfaces 32 of multiple reflector cells 22 permit the use of a source of relatively low pressure coolant for minimizing reflector surface distortion.

In summary, an optical reflector 20 is described, according to the invention, in which a plurality of thin walled, hollow cells 22, supporting a plurality of light reflecting surfaces 24 are positioned on a common reflector base 26 to inhibit the deformation of optical reflector 20. Each cell includes feeder means, such as feeder tubes 38, for providing a turbulent flow or spray of liquid coolant against internal cell surfaces 32. The common reflector base 26 includes a first chamber 34 for providing a flow of a suitable pressurized coolant to feeder means 38 and a second chamber 36 for collecting the returning coolant from internal cell surfaces 32 and passing the coolant to a reservoir.

It should be appreciated that the described embodiment illustrating an arrangement of multiple cells 22 each having a light reflecting front surface in the shape of a square or rectangle is only by way of example. Each cell 22 may have a shape such as a square, rectangle, triagle, hexagon or have external wall surfaces with curves bounded by an adjacent cell with matching external curved wall surfaces. Thus, many other arrangements can readily be devised in accordance with the described principles as will be apparent to those skilled in the art.

In practice, an optical reflector 20 according to the invention may typically be formed of a square array of 100 or more light reflecting surfaces 24, each surface 24 being a square of substantially 1 sq. inch. The gap dimension is substantially 0.001 inch. The height, $d$, is substantially 1 inch. The coupling manifold 26 and feeder tube 38 may be formed of invar. The material for the surface 24 may be copper as is cell wall 28.

What is claimed is:

1. A laser beam reflector comprising:
   a base,
   a plurality of adjacent hollow cells, each cell having a hollow core defined by an enclosure mounted on said base, said enclosure being formed by a plurality of walls supporting a laser beam radiant energy reflecting surface spaced from said base, each of said surfaces having an edge closely spaced from an edge of an adjacent surface, said surfaces being formed into an array to provide a substantially continuous reflecting surface for radiant energy incident thereon; and
   cooling means disposed in said base for providing a fluid coolant to the core of each of said hollow cells for cooling said surface,
   said cooling means including coolant manifold means disposed in said base and further including coolant feed means disposed inside each core of said cell in communication with said manifold means for dispersing said fluid coolant against said walls and surface,
   said edges being spaced from each other a distance arranged to dissipate negligible radiant energy from said beam between said walls.

2. A radiant energy reflector according to claim 1, wherein said coolant feeder means include a tube having a metering nozzle at one end, said nozzle having at least one orifice for providing an egress for said coolant to said hollow cells.

3. A radiant energy reflector according to claim 2, wherein said metering nozzle orifice is arranged to direct a turbulent flow of said coolant to said hollow cells.

4. A radiant energy reflector according to claim 1, further including means for collecting said fluid coolant from each of said hollow cells.

* * * * *